Patented Aug. 4, 1942

2,291,915

UNITED STATES PATENT OFFICE 2,291,915

PROCESS OF PREPARING STYRENES

Robert C. Palmer, Carlisle H. Bibb, and William T. McDuffee, Jr., Pensacola, Fla., assignors to Newport Industries, Inc., Pensacola, Fla., a corporation of Delaware No Drawing. Application November 15, 1939, Serial No. 304,583

4 Claims. (Cl. 260—669)

This invention relates to a method of preparing styrenes. More particularly the invention pertains to a method of preparing para-methyl-styrene from para-cymene.

It has heretofore been proposed to prepare para-methyl-styrene directly from para-cymene by pyrolytic methods. Such methods, however, yield but indifferent results. In particular, styrenes thus prepared are contaminated with other pyrolytic products which are removable only with extreme difficulty.

We have found that para-cymene may easily and efficiently be converted into pure styrenes by a method comprising an initial liquid phase catalytic oxidation with molecular oxygen yielding an oily mixture of unoxidized para-cymene, carboxylic acids, para-methyl-acetophenone, para-tolyl-dimethyl-carbinol and other products. After a washing with a dilute alkali solution to remove the acids formed, the oil is fractionally distilled under vacuum to give, as one fraction, a mixture of para-methyl-acetophenone and para-tolyl-dimethyl-carbinol.

We have further found that this fraction constitutes an excellent raw material for the preparation of styrenes, in spite of the fact that the fraction comprises two chemically dissimilar but nevertheless difficultly separable compounds. The mixed ketone and carbinol, may, for instance, be subjected to hydrogenation whereby the ketone is transformed into a carbinol. The resulting mixture of carbinols may then be dehydrated to yield a mixture of para-methyl-styrene and para-methyl-alpha-methyl-styrene. As pointed out in our copending application entitled "Styrene polymerization products and process of making the same" filed of even date herewith, these mixed styrenes are capable of mutual reaction with formation of excellent resins. However, the mixed styrenes are also easily separable by fractional distillation, for their boiling points lie 18° C. apart.

If the above disclosed hydrogenation be omitted, the subsequent dehydration yields a mixture of para-methyl-acetophenone and para-methyl-alpha-methyl-styrene which may easily be separated into its constituent parts by fractional distillation. The para-methyl-acetophenone may then be separately hydrogenated and dehydrated, to yield a pure para-methyl-styrene.

We have found that para-methyl-alpha-methyl-styrene may be catalytically oxidized in the liquid phase with molecular oxygen to yield para-methyl-acetophenone. The latter compound may be hydrogenated and dehydrated as disclosed hereinabove, either per se or after admixture with the hereinabove disclosed ketone-carbinol fraction.

It is therefore an important object of the present invention to provide a method of preparing compositions of matter capable of resin formation from mixed aryl-alkyl ketones and secondary or tertiary aromatic alcohols.

Another important object of this invention is to provide a method of preparing from mixed para-methyl-acetophenone and para-tolyl-dimethyl-carbinol a composition of matter capable of resin formation.

Yet another important object of this invention is to provide a method of preparing a composition of matter capable of resin formation from the mixed ketonic and carbinolic oxidation products of para-cymene.

A further important object of this invention is to provide a method of preparing from para-cymene a mixture of styrenes capable of mutual reaction with resin formation.

An additional important object of this invention is to provide a method of completely converting mixed para-methyl-acetophenone and para-tolyl-dimethyl-carbinol into para-methyl-styrene.

Other and further objects of the present invention will become apparent from the following description and appended claims.

The mixtures of para-methyl-acetophenone and para-tolyl-dimethyl-carbinol forming the raw material of the processes according to the present invention are most expediently prepared by a catalytic liquid phase oxidation of para-cymene with molecular oxygen. The following example will illustrate such an oxidation.

500 gallons of para-cymene are discharged into a vessel equipped with a reflux condenser, agitator, and a pipe or conduit long enough to dip below the surface of the cymene. 80 pounds of powdered anhydrous manganese acetate is then added. The temperature is raised to about 140° C., and air is passed through said pipe or conduit into the cymene for about 8 hours at a rate of about 40 cubic feet per minute. The resulting oily mixture is washed with dilute hydrochloric acid to remove manganese compounds and then with a dilute alkali solution to remove the carboxylic acids formed during the oxidation. The acid free oil is fractionally distilled under vacuum to give, as one fraction, a mixture of para-methyl-acetophenone and para-tolyl-dimethyl-carbinol. Unoxidized cymene is also recovered in this fractional distillation.

Temperatures as low as 30° C. may be used. Other heavy metal catalysts such as lead, cobalt, iron, nickel, copper, vanadium, chromium, and mercury compounds and mixtures thereof are also effective, although yielding, similarly to lower temperatures, mixtures containing relatively less para-methyl-acetophenone as compared with para-tolyl-dimethyl-carbinol than is obtained in the above described example.

According to the present invention, the mixed para-methyl-acetophenone and para-tolyl-dimethyl-carbinol are hydrogenated in any suitable hydrogenation apparatus by contacting the mixture with gaseous hydrogen at a temperature of from 70° C. to 110° C. at a pressure ranging from atmospheric pressure up to 300 pounds per square inch. Any suitable catalyst may be used, for instance, the known noble metal hydrogenation catalysts. The catalysts may also consist of the finely divided mixture of metallic copper and nickel probably also containing some oxides of these metals obtainable by heating the formates of these metals at about 170° C. in the presence of dipentene as disclosed in our copending application Serial No. 225,724 filed August 19, 1938, and entitled "Process of treating monocyclic terpene hydrocarbons." Such heating decomposes said formates, with formation of the active catalyst, which is then separated from the terpene. A suitable ratio of copper formate to nickel formate is 3:1, and about 5 per cent by weight of the para-methyl-acetophenone is a suitable amount to be added.

Within the above indicated pressure and temperature ranges the hydrogenation is confined to the reduction of the carbonyl group. If the hydrogen is well dispersed by agitation, or if by other means a large reacting surface is provided, the hydrogenation is very rapid, 5 hours or less being sufficient to complete the reaction.

This method of hydrogenation is of course applicable to isolated para-methyl-acetophenone.

The mixture of secondary and tertiary alcohols is then catalytically dehydrated in the vapor phase at a temperature of from about 300° C. to about 320° C. The catalyst used may comprise alumina, aluminum phosphate or the like. An alumina catalyst may be prepared as follows:

5.5 pounds of finely powdered aluminum hydroxide are mixed with 33 pounds of pea-size, broken pumice which has been thoroughly wetted with water. The aluminum hydroxide forms an adherent coat on the pumice.

The dehydrator may suitably comprise a 15 foot long steel tube 4 inches in diameter. The inlet end of this pipe is connected to a pipe trap through which the mixture of secondary and tertiary alcohols to be dehydrated may be fed. The outlet end of the pipe is connected to a suitable condenser. The pipe may be heated to about 300° C. to 320° C. along its entire length by a suitable bath or by electric heating elements. The catalyst is disposed within the tube so as to fill the 10 feet adjacent the outlet end, thus leaving 5 feet of the tube at the inlet end empty.

The dehydration is initiated by filling the trap with the mixed secondary and tertiary alcohols. The tube is then heated to about 300° C. After the water has distilled off of the catalyst the mixed alcohols are fed through the trap at a rate of about 3 gallons per hour. This mixture flows through the trap and into the empty end of the steel tube where it is vaporized and then forced through the catalyst.

This dehydration yields a mixture of styrenes, water and impurities. A partial distillation under vacuum will separate the styrenes from the other products and from each other.

If desired, dehydration may also be effected by refluxing the mixed secondary and tertiary alcohols over about 2 per cent, by weight, of activated charcoal, for about 3 hours. A solvent such as toluene may be added to lower the refluxing temperature.

Similarly to the vapor phase dehydration with alumina the liquid phase dehydration with activated charcoal yields para-methyl-styrene, para-methyl-alpha-methyl-styrene, water and impurities comprising a liquid non-volatile resin. The pure styrenes may be removed by fractional distillation either as a mixture or separately.

These methods of dehydration are obviously also operative with isolated secondary and tertiary alcohols. Such alcohols may also be dehydrated in the presence of ketones such as para-methyl-acetophenone without affecting the latter.

The present invention therefore comprises, broadly speaking, a variable sequence of interdependent catalytic hydrogenating and dehydrating steps operating on initially complex mixtures of aromatic ketones and alcohols to produce therefrom compositions of matter capable of forming excellent resins.

As pointed out, numerous details of the present invention may be varied within a wide range without departing from the principles of this invention, and we, therefore, do not purpose limiting the patent granted hereon otherwise than necessitated by the appended claims.

We claim as our invention:

1. In a method of preparing styrenes from a mixture of para-methyl-acetophenone and para-tolyl-dimethyl-carbinol as obtained by a liquid phase catalytic oxidation of para-cymene, the step comprising catalytically dehydrating said para-tolyl-dimethyl-carbinol to form para-methyl-alpha-methyl-styrene in the presence of said para-methyl acetophenone.

2. In a method of preparing styrenes from a mixture of para-methyl-acetophenone and para-tolyl-dimethyl-carbinol as obtained by a liquid phase catalytic oxidation of para-cymene, the step comprising catalytically hydrogenating said para-methyl-acetophenone to form para-tolyl-methyl-carbinol in the presence of said para-tolyl-dimethyl-carbinol.

3. In a method of preparing mixed styrenes from a mixture of para-methyl-acetophenone and para-tolyl-dimethyl-carbinol as obtained by the oxidation of para-cymene, the steps which comprise catalytically hydrogenating said para-methyl-acetophenone to form para-tolyl-methyl-carbinol in the presence of said para-tolyl-dimethyl-carbinol and catalytically dehydrating said para-tolyl-dimethyl-carbinol and said para-tolyl-methyl-carbinol in the presence of each other to form a mixture of para-methyl-styrene and para-methyl-alpha-methyl-styrene.

4. The method of preparing a mixture of para-methyl-styrene and para-methyl-alpha-methyl-styrene, which comprises subjecting a mixture of para-methyl-acetophenone and para-tolyl-dimethyl carbinol to catalytic hydrogenation to convert the para-methyl-acetophenone into para-tolyl-methyl carbinol and without intermediate separation of any of its constituents subjecting the resulting mixture to catalytic dehydration to produce a mixture of para-methyl-styrene and para-methyl-alpha-methyl-styrene.

ROBERT C. PALMER.
CARLISLE H. BIBB.
WILLIAM T. McDUFFEE, Jr.